US011963008B2

(12) United States Patent
Acharya et al.

(10) Patent No.: US 11,963,008 B2
(45) Date of Patent: Apr. 16, 2024

(54) GEOLOCATION-BASED NOTIFICATIONS USING RELATIONSHIPS IN SEPARATE SYSTEMS

(71) Applicant: TRUIST BANK, Charlotte, NC (US)

(72) Inventors: Satya Acharya, Cary, NC (US); Sathiyasuresh Pandian, Cary, NC (US); Brandon Stone, Bahama, NC (US); Jason Pedone, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 321 days.

(21) Appl. No.: 17/524,077

(22) Filed: Nov. 11, 2021

(65) Prior Publication Data

US 2022/0167165 A1 May 26, 2022

Related U.S. Application Data

(60) Provisional application No. 63/118,114, filed on Nov. 25, 2020.

(51) Int. Cl.
*H04W 12/069* (2021.01)
*G06T 19/00* (2011.01)
*H04W 64/00* (2009.01)

(52) U.S. Cl.
CPC ......... *H04W 12/069* (2021.01); *G06T 19/006* (2013.01); *H04W 64/003* (2013.01)

(58) Field of Classification Search
CPC . H04W 12/069; H04W 64/003; H04W 4/021; H04W 4/023; H04W 12/63; G06T 19/006
See application file for complete search history.

(56) References Cited

U.S. PATENT DOCUMENTS

| 10,719,858 | B2 * | 7/2020 | Mimassi | ............... H04W 76/40 |
| 2017/0278145 | A1 * | 9/2017 | Mimassi | ............... H04W 76/40 |
| 2019/0026785 | A1 * | 1/2019 | Bobis | ................. G06Q 30/0271 |
| 2019/0281412 | A1 * | 9/2019 | Yang | ..................... H04W 4/029 |

* cited by examiner

*Primary Examiner* — Bryan Y Lee
(74) *Attorney, Agent, or Firm* — Kilpatrick Townsend & Stockton LLP; Michael A. Springs, Esq.

(57) ABSTRACT

A server can be configured for facilitating notifications about interaction opportunities for users using database relationships of separate types of data from different systems. The server can receive token data from an application executing on a mobile computing device. The token data can include geolocation data of the mobile computing device and identification data of the user. The server can determine a location of the mobile computing device using the geolocation data. The server can use the identification data of the user to receive interaction opportunities based on the identification data and criteria associated with the interaction opportunities. The server can use the identification data to receive interaction opportunities that are associated with locations within a pre-selected distance of the location of the mobile computing device. The server can transmit the interaction opportunities to the mobile computing device for output by the application.

20 Claims, 6 Drawing Sheets

GEOLOCATION-BASED NOTIFICATIONS USING RELATIONSHIPS IN SEPARATE SYSTEMS

CROSS-REFERENCE TO RELATED APPLICATION

This claims priority to U.S. Provisional Application Ser. No. 63/118,114, filed Nov. 25, 2020, and titled "Geolocation-Based Notifications Using Relationships in Separate Systems," the contents of which are incorporated herein by reference.

TECHNICAL FIELD

The present disclosure relates generally to leveraging data from separate data systems and, more particularly (although not necessarily exclusively), to using relationships between separate data systems for facilitating geolocation-based notifications.

BACKGROUND

Separate data systems can include different types of data in different formats. The types of data may be similar but may be represented differently. One or more relationships may exist between the separate data systems. For example, data from a first data system may depend on data from a second data system. In another example, the first data system may include a subset of data included in the second data system. The separate data systems may be owned, managed, operated, or the like by separate entities. For example, the first data system may be operated by a financial institution, and the second data system may be operated by a mobile phone service provider. A user, such as a consumer or account holder, may interact with the first data system, the second data system, and other suitable separate data systems. The entity associated with the first data system may offer one or more interaction opportunities (e.g., sales, account-offers, etc.). Providing the interaction opportunities to the user may be technically challenging. For example, the interaction opportunity may be location-dependent, time-dependent, or may include other dependencies that may cause at least a subset of users to ignore or to otherwise not understand the presented interaction opportunities.

SUMMARY

In one example, a server can be configured for facilitating notifications about interaction opportunities for users by using database relationships of separate types of data from different systems. The server can receive token data from an application executing on a mobile computing device. The token data can include geolocation data of the mobile computing device and identification data of the user. The server can determine a location of the mobile computing device using the geolocation data. The server can use the identification data of the user to receive interaction opportunities for which the user qualifies based on financial account interaction data associated with the identification data of the user and criteria associated with the interaction opportunities. The server can use the identification data to receive interaction opportunities that are associated with locations within a pre-selected distance of the location of the mobile computing device. The server can transmit the interaction opportunities to the mobile computing device for output by the application.

In another example, a method can be used for facilitating notifications about interaction opportunities for users by using database relationships of separate types of data from different systems. Token data can be received from an application executing on a mobile computing device. The token data can include geolocation data of the mobile computing device and identification data of the user. A location of the mobile computing device can be determined using the geolocation data. The identification data of the user can be used to receive interaction opportunities for which the user qualifies based on financial account interaction data associated with the identification data of the user and criteria associated with the interaction opportunities. The identification data can be used to receive interaction opportunities that are associated with locations within a pre-selected distance of the location of the mobile computing device. The interaction opportunities can be transmitted to the mobile computing device for output by the application.

In another example, a non-transitory computer-readable medium can include instructions that are executable by a processing device for facilitating notifications about interaction opportunities for users by using database relationships of separate types of data from different systems. The instructions can include receiving token data from an application executing on a mobile computing device. The token data can include geolocation data of the mobile computing device and identification data of the user. The instructions can include determining a location of the mobile computing device using the geolocation data. The instructions can include using the identification data of the user to receive interaction opportunities for which the user qualifies based on financial account interaction data associated with the identification data of the user and criteria associated with the interaction opportunities. The instructions can include using the identification data to receive interaction opportunities that are associated with locations within a pre-selected distance of the location of the mobile computing device. The instructions can include transmitting the interaction opportunities to the mobile computing device for output by the application.

DETAILED DESCRIPTION

Certain aspects and features relate to facilitating notifications about interaction opportunities for users by using database relationships of separate types of data from different systems. The different systems may include telecommunications systems, account systems, and geolocation systems. Other suitable systems may be used for notifying users about interaction opportunities. The telecommunications systems may include a mobile computing device of a user and an application installed on the mobile computing device. Data may be acquired by the telecommunications systems by input from the user. For example, the user may input user data or account information, such as a username and password combination, into the mobile computing device upon initializing the application on the mobile computing device. In other examples, the user may use the mobile computing device to perform interactions that the mobile computing device may track or otherwise store data for such as a merchant, a product-type, and the like.

The account systems may include a backend server and a server for determining interaction opportunities. The interaction opportunities can include transactional opportunities or other suitable interaction opportunities Data acquired or stored by the account systems may include user account information, interaction opportunities, and other suitable data for being stored on the account systems. In some examples, the data may be transmitted to and received by the servers from the mobile computing device. In these examples, when interactions are performed by the user, the backend server may store information relating to the interaction such as the product-type, the user account information, an amount spent, and the like. The server may subsequently store the information by augmenting the information to an interaction history of the user. The geolocation systems may include the mobile computing device of the user and components of a GPS system for determining geolocation of the mobile computing device. Data may be acquired by the geolocation systems via the GPS system. For example, upon the user initializing the application of the mobile device, the GPS system may acquire the geolocation of the mobile computing device. The GPS system may subsequently save the geolocation or may transmit the geolocation for subsequent use. In some examples, the geolocation may be transmitted to the backend server or to the server for determining interaction opportunities.

The data from the telecommunications systems, the account systems, and the geolocation systems may be leveraged to determine interaction opportunities for which the user qualifies that are within a pre-set distance. The user data from the telecommunication system, the user account information from the account systems, and the geolocation data from the geolocation systems may be transmitted to the server for determining interaction opportunities to offer the user. The server may use the user data and the user account information to determine an interaction history of the user, and based on the interaction history of the user, the server may determine interaction opportunities for which the user qualifies. The server may subsequently use the geolocation data to filter or otherwise select interaction opportunities that are within the pre-set distance from the geolocation of the mobile computing device. The interaction opportunities within the pre-set distance may be transmitted to the mobile computing device by the server for viewing by the user. In some examples, the interaction opportunities may be determined by mapping information from the interaction history of the user to available interaction opportunities stored on the server by a trained neural network included on the server.

Various institutions may track interaction data of customers or users. In one such example, a financial institution may track or record a customer's interaction history via an interaction card issued to the customer. In this example, the interaction card, such as a debit card or a credit card, may be used by the user to perform various interactions, and information relating to the interactions, such as the product type, an amount spent, etc., may be saved by a backend server. The various institutions may store the interaction data as an interaction history on the server for subsequent use. The server may receive interaction opportunities based on the interaction history of the user. In some examples, the server may determine the interaction opportunities for subsequent use. This determination may be made in part by mapping the interaction history to the interaction opportunities. In some examples, this mapping may be carried out by a trained neural network that is included in the server. In other examples, the server may be a first server and may transmit the interaction history to a second server for determining the interaction opportunities. In this example, the first server may receive the interaction opportunities from the second server for subsequent use. The second server may be owned or operated by a third-party service, and the second server may store or receive a log of interaction opportunities from various merchants or other suitable entities. The second server may additionally include a neural network, or other suitable components, for determining the interaction opportunities based on the interaction history of the user. In either example, the neural network may map the interaction history to available interaction opportunities. In both examples, the interaction opportunities may be transmitted to a mobile computing device of the user for viewing by the user. But, the interaction opportunities may vary in distance from the mobile computing device of the user. For example, some of the interaction opportunities may be greater than or about 30 miles away, and in this case, the user may not choose to accept these interaction opportunities. The mobile computing device may communicate wirelessly with the server, and vice versa, through a wide-area network such as the Internet.

A geolocation of the mobile computing device of the user may be used to determine the interaction opportunities to present to the user. The server may receive user data and geolocation data from the mobile computing device of the user. The user data and the geolocation data may include user identification data such as a geolocation of the mobile computing device of the user and account information of the user, among other suitable user identification data. The mobile computing device may include an application installed on the mobile computing device. In some examples, the application may be developed by, owned by, or otherwise correspond to the institution of which the user is a customer. The application may use or include user account information such as banking information of the user, username and password combinations of the user, and the like. Upon the user initializing the application, the application may cause the mobile computing device to transmit the user data and the geolocation data to the server. In some examples, initializing the application may involve authenticating the user via a username and password combination or an alternative, suitable authentication method.

The server may receive the user data and the geolocation data and may locate or otherwise determine the interaction history of the user based on the account information of the user that is included in the user data, the geolocation data, or a combination thereof. In response to the server locating or determining the interaction history of the user, the server may determine the geolocation of the mobile computing device of the user based on the geolocation data. The geolocation data may include GPS coordinates of the mobile computing device, network component identifiers through which the mobile computing device is connected to the server, identifiers of computing devices nearby to the mobile computing device, a combination thereof, or other suitable geolocation data. In some examples, the mobile computing device may include a standard positioning services (SPS) receiver that may receive signals from SPS satellites using an SPS antenna. The signals from the SPS satellites may include geolocation information. Based on the interaction history of the user, the server may receive interaction opportunities for which the user qualifies, and the geolocation data may be used to determine the interaction opportunities to which the user is in close proximity. Interaction opportunities in close proximity may be interaction opportunities located within a pre-set distance from the geolocation of the mobile computing device of the user. For example, an interaction opportunity within two miles of the geolocation of the mobile computing device of the user may be considered in close proximity. The pre-set distance may be other suitable pre-set distances for interaction opportunities for which the user qualifies. In some examples, the geolocation data of the mobile computing device may be used for determining interaction opportunities to present to the user that are within the pre-set distance.

The interaction opportunities within the pre-set distance may be a subset of a total amount of interaction opportunities for which the user qualifies based on the interaction history of the user. In some examples, the server may not receive the total amount of interaction opportunities for which the user qualifies. In other examples, the server may receive the total amount of interaction opportunities for which the user qualifies. For example, the neural network of the server may map the interaction history to a set of twenty-three interaction opportunities. In this example, the server may filter out interaction opportunities that are not within the pre-set distance from the geolocation of the mobile computing device of the user. For example, three of the twenty-three interaction opportunities may be located within the pre-set distance, so the server may remove the other twenty interaction opportunities and transmit the three interaction opportunities to the mobile computing device. Any other suitable amounts of interaction opportunities or filtered interaction opportunities can be located or used (e.g., transmitted to the user).

In some examples, the server may use the geolocation of the mobile computing device and the interaction history of the user to determine and receive the interaction opportunities for which the user qualifies for presenting to the user. In this case, the geolocation may be used for determining which of the interaction opportunities to present to the user. Alternatively, the server may be a first sever, and the first server may transmit the geolocation of the mobile computing device and the interaction history of the user to a second server for determining the interaction opportunities for which the user qualifies. In this case, the first server may receive the interaction opportunities from the second server. Upon determining or receiving the interaction opportunities for which the user qualifies within the pre-set distance, the server may transmit the interaction opportunities to the mobile computing device of the user for output by the application.

The server may transmit the interaction opportunities for which the user qualifies within the pre-set distance to the mobile computing device of the user, and the application installed on the mobile computing device may output the interaction opportunities for viewing by the user. In some examples, the interaction opportunities may be transmitted to the computing device when the user initializes the application. In other examples, the application may have previously been initialized. In these examples, the user may be traveling while the application is running, and the server may periodically transmit new or updated interaction opportunities to the mobile computing device. Historically, the interaction opportunities may have been passively listed on the application for viewing by the user. For example, the interaction opportunities may be presented to the user as a list at the bottom of the application installed on the mobile computing device. In this historical configuration, the interaction opportunities may not be prominently displayed, meaning that the interaction opportunities may not be noticed by the user.

In response to the mobile computing device receiving the interaction opportunities for which the user qualifies, the application may output the interaction opportunities via a push notification. The push notification may be a pop-up user interface with which the user may interact. For example, upon initializing the application, the user may be presented with the user interface that informs the user of a set of interaction opportunities, the user interface having options to accept or to ignore the interaction opportunities. In this example, the user interface may include names and locations of merchants corresponding to the interaction opportunities for which the user qualifies. The user may additionally be presented with an option to accept the interaction opportunity or to ignore the interactional opportunity. In some examples, the user interface may include an option to cause the mobile computing device to navigate the user to an interaction opportunity that the user accepts. For example, a user interface may pop-up after a user, for example Mr. Doe, initializes the application, and the user interface can include an interaction opportunity for General Tooling, Inc. Mr. Doe may interact with the user interface and accept the interaction opportunity, and, by accepting the interaction opportunity, the computing device of Mr. Doe may initiate navigation to General Tooling, Inc., or perform other suitable tasks.

In other examples, the push notifications may include a banner notification that may be presented at the top of the mobile computing device upon initialization of the application by the user that informs the user of interaction opportunities within the pre-set distance of the geolocation of the mobile computing device. In this example, the user may select the banner notification, and this selection may cause the mobile computing device to display the interaction opportunities for viewing by the user. The user may subsequently choose to accept one or more of the interaction opportunities, or the user may choose to ignore the interaction opportunities. The push notifications may include other suitable notifications for displaying interaction opportunities within the pre-set distance of the geolocation of the mobile computing device of the user for viewing by the user.

In response to the mobile computing device receiving the interaction opportunities for which the user qualifies, the application may additionally or alternatively output the interaction opportunities via an augmented reality feature or interface of the application. The application may output a notification in the form of a user interface to the user that interaction opportunities are available nearby. In this example, the user may be presented with an option to ignore the notification and an option to cause the mobile computing device to load and display the augmented reality feature of the application for viewing the interaction opportunity via the augmented reality feature. The augmented reality feature may use a camera of the mobile computing device to display a building of a merchant corresponding to one of the interaction opportunities for which the user qualifies, and the augmented reality feature may display a user interface corresponding to the building of the merchant. For example, upon initializing the application, the user may be presented with the user interface and choose to navigate to the augmented reality feature. Upon loading the augmented reality feature, the user may point the mobile computing device (e.g., via a camera of the mobile computing device) in a direction of the merchant offering the interaction opportunity. Once the merchant is in view of the camera of the mobile computing device, the augmented reality feature may cause the mobile computing device to present the user with a subsequent user interface relating to the interaction opportunity. The subsequent user interface may inform the user of details about the interaction opportunity, such as the specific deal or discount offered by the merchant, and may include an option to accept the interaction opportunity and additionally may include an option to ignore the interaction opportunity. Any suitable number of interaction opportunities located within the pre-set distance of the geolocation of the mobile computing device may be displayed via the augmented reality feature.

In other examples, the user may initialize the application installed on the mobile computing device and subsequently initialize the augmented reality feature of the application without being notified of interaction opportunities. Upon initializing the augmented reality feature, the mobile computing device may transmit the user data and the geolocation data of the mobile computing device of the user to the server for determining interaction opportunities within the pre-set distance of the geolocation of the mobile computing device. The server may transmit the interaction opportunities to the mobile computing device, and the augmented reality feature of the application of the mobile computing device may display the interaction opportunities for viewing by the user. For example, the user may be located in a downtown area of a major city and may desire to know if any interaction opportunities are nearby. The user may initialize the application and subsequently initialize the augmented reality feature. In doing so, the mobile computing device may transmit data to the server for determining interaction opportunities nearby. The user may view and decide to accept or ignore interaction opportunities displayed in the augmented reality feature of the application installed on the mobile computing device. In some examples, no interaction opportunities may be available to the user within the pre-set distance, or the user, based on the interaction history, may not qualify for interaction opportunities within the pre-set distance. In this case, the augmented reality feature may not display interaction opportunities for viewing by the user. In other examples, one or more interaction opportunities may be displayed by the augmented reality feature of the computing device. In this example, the user may choose to accept or choose to ignore a subset of the displayed interaction opportunities.

In the following description, for the purposes of explanation, specific details are set forth in order to provide a thorough understanding of various implementations and examples. Various implementations may be practiced without these specific details. The figures and description are not intended to be restrictive.

Figure 1:
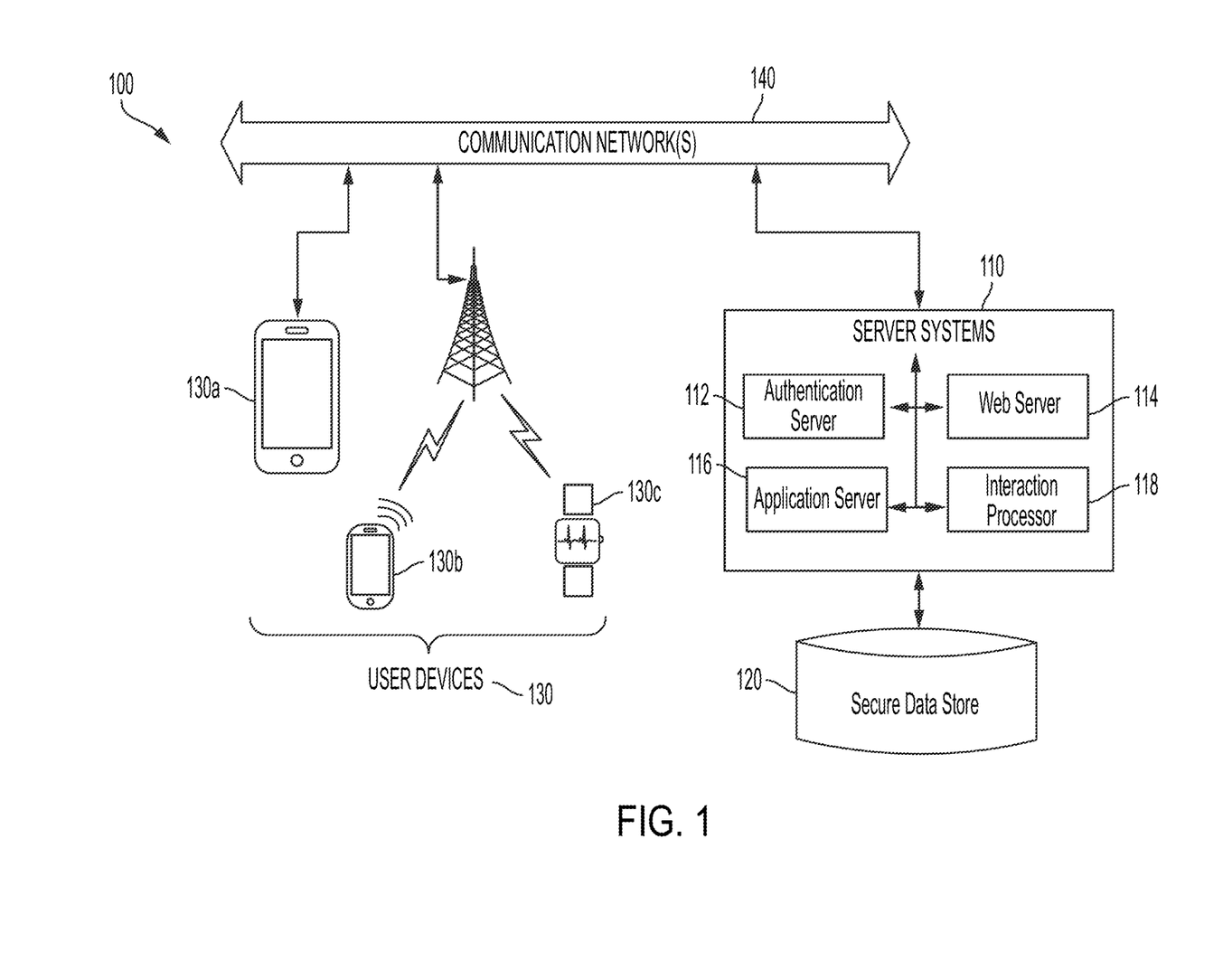
FIG. 1 is a schematic of a network environment in which interaction opportunities for which users qualify can be determined according to one example of the present disclosure.

FIG. 1 is a schematic of a network environment 100 in which interaction opportunities for which users qualify can be determined according to one example of the present disclosure. Included in the network environment 100 are user devices 130, one or more communication networks 140, and a server system 110. The user devices 130 may request and access resources within the server system 110 over one or more communications networks 140. The network environment 100 may correspond to Wide Area Network ("WAN") environment, such as the Internet, through which user devices 130 may communicate with servers via web browsers or client-side applications, to establish communication sessions, request and receive web-based resources, and access other features of the backend applications or services.

The server system 110 may be communicatively coupled to a data store 120 through one or more networks. Server system 110 may be or include any type of server including, for example, a rack server, a tower server, a miniature server, a blade server, a mini rack server, a mobile server, an ultra-dense server, a super server, or the like. The server system 110 and may include various hardware components, for example, a motherboard, a processing unit, memory systems, hard drives, network interfaces, power supplies, etc. Server system 110 may include one or more server farms, clusters, or any other appropriate arrangement or combination or computer servers. Additionally, server system 110 may act according to stored instructions located in a memory subsystem of the server system 110, and may execute an operating system or other applications.

The server system 110 may also implement several different applications and services, and perform additional server-side functionality including by an authentication server 112, web server 114, application server 116, and a backend interaction processor 118. For example, in implementations of banking or financial services systems, electronic commerce systems, and the like, the web-based resources provided by web server 114 or applications supported by application server 116 may be used by user devices 130 to access account information and perform application functions related to multiple accounts. The data store 120 may store any information necessary for the server system 110 to implement any functions of an application in relation to account access and permissions. In some examples, the server system 110 and data store 120 can be a single computing device that implements an application and stores user account information.

The data store 120 can include a profile of the known devices and behaviors of each user for each account provided by a certain application. For example, a single user may have two accounts for a particular application. The user may typically use a desktop computer to access information related to a first account, while more often use a mobile device 130 to access information related to the second account. The data store 120 may record these user activity observations over time as a user profile for the server system 110 for use in determining future interaction opportunities for which the user qualifies. For example, if a user frequently purchases sporting goods, future interaction opportunities may frequently include sporting goods merchants. The data store 120 also may include a set of defined rules configurable by the user or entity providing the account services.

The user devices 130, which can be any number, can be capable of accessing and establishing communication sessions with the server system 110 and the data store 120 through the communication networks 140. As shown in this example, user devices 130a-130c correspond to mobile devices, including tablet computers 130a, smartphones 130b, and smart watches 130c, which may access the server system 110 via a Local Area Network ("LAN") or Wide Area Network (WAN) 140, as well as mobile telecommunication networks, short-range wireless networks, or various other communication network types (e.g., cable or satellite networks). Although certain examples herein are described in terms of mobile devices 130, it should be understood that other types of user devices 130, including both mobile and non-mobile devices, may be used in various embodiments.

Although certain components are shown in FIG. 1, any number of compatible network hardware components and network architecture designs may be implemented in various embodiments to support communication between the server system 110, data store 120, and various user devices 130. Such communication networks may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the user devices 130 and server system 110 in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
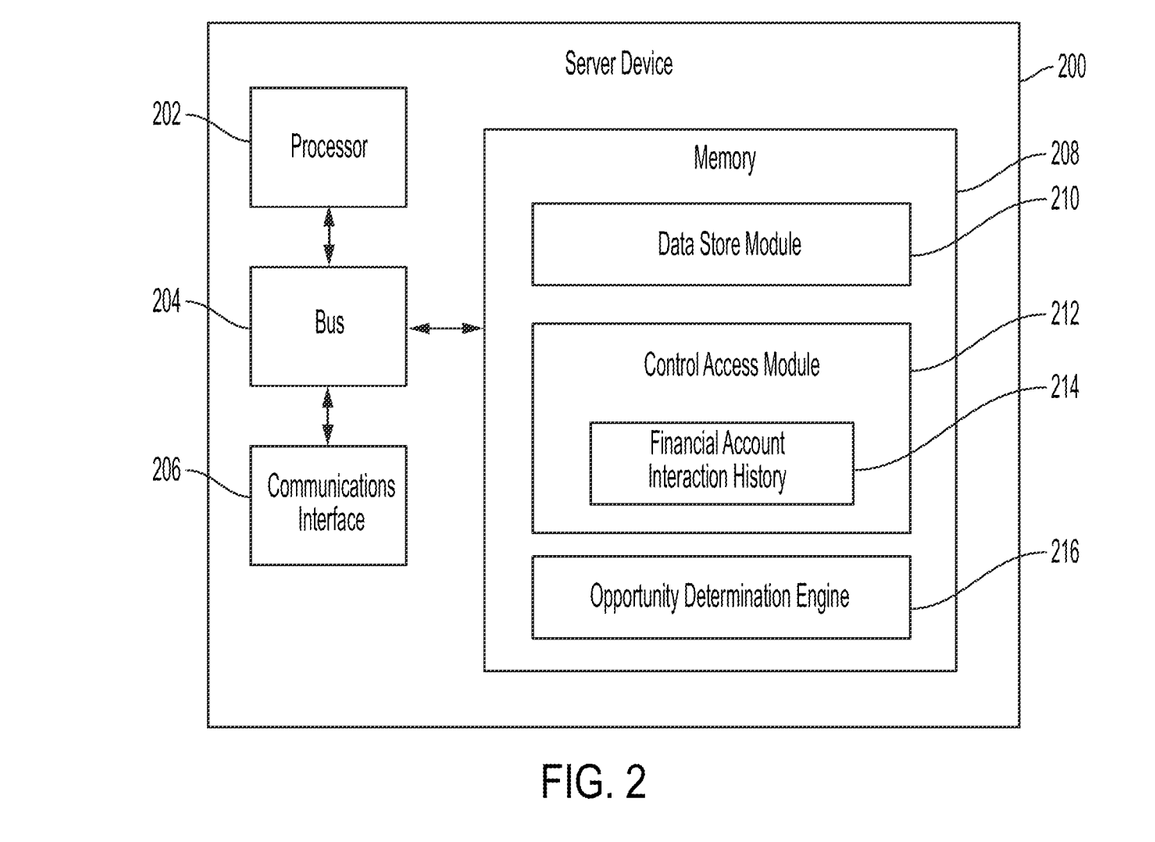
FIG. 2 is a block diagram of an example of a server device configured to execute programming code to present interaction opportunities to a user of a mobile computing device according to one example of the present disclosure.

FIG. 2 is a block diagram of an example of a server device 200 configured to execute programming code to present interaction opportunities to a user of a mobile computing device according to one example of the present disclosure. The server device 200 may be a network device and may include a processor 202, a bus 204, a communications interface 206, and a memory 208. In some examples, the components shown in FIG. 2 may be integrated into a single structure. For example, the components can be within a single housing. In other examples, the components shown in FIG. 2 can be distributed (e.g., in separate housings) and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C #, etc.

The communications interface 206 may interface other network devices or network-capable devices to analyze and receive information related to accessing functions of an application. Information received from the communications interface 206 may be sent to the memory 208 via the bus 204. The memory 208 can store any information received from the communications interface 206.

The memory 208 may include program code for determining interaction opportunities for which the user qualify. The interaction opportunities may be within a pre-set distance of a geolocation of a mobile computing device of the user. The memory 208 may include program code for a data store module 210, and a control access module 212 including a financial account interaction history 214. Also included in the memory 208 is an opportunity determination engine 216 that may be used to access data from backend data stores (e.g., data store 120 in FIG. 1) and perform various system functions related to determining interaction opportunities. In the example of financial services server 200, the opportunity determination engine 216 may perform functions including retrieving financial account information, finding interaction opportunities offered by merchants, etc. The data store module 210 may store user account information (e.g., username and password, security information, interaction data) for a number of users and client devices 130, including originating IP addresses of login attempts, browser settings of login attempts, etc. The control access module 212 may validate whether a user access attempt has been successfully authenticated after a user has entered the correct account login information. In some cases, the control access module 212 also may determine the account information of the user. The results from the control access module 212 may be used determine interaction opportunities to present to the user for which the user qualifies, the determination made, in some cases, by the opportunity determination engine 216.

Figure 3:
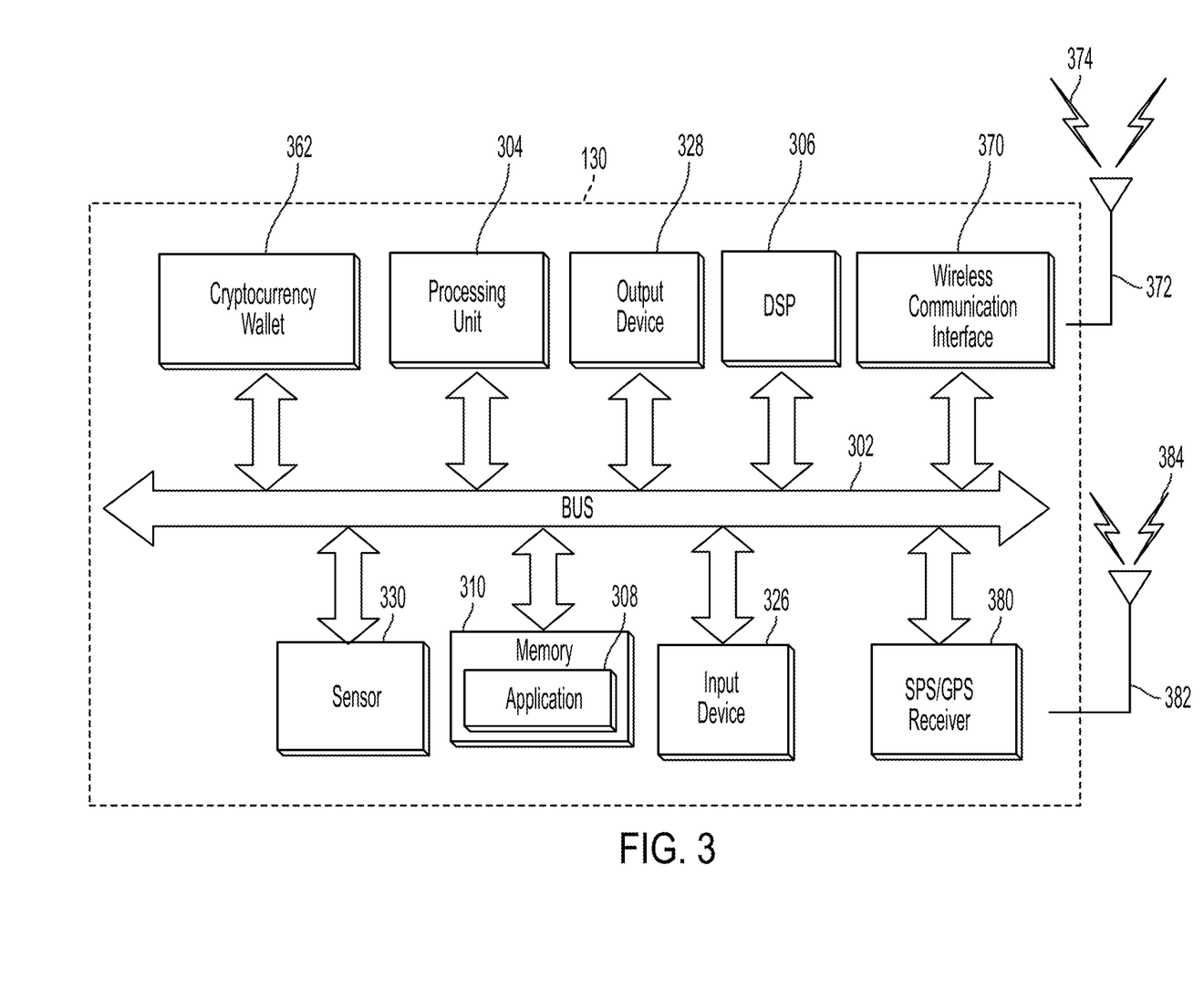
FIG. 3 is a block diagram of a user device usable in a system for determining, and presenting to a user, interaction opportunities for which the user qualifies according to one example of the present disclosure

FIG. 3 is a block diagram of a user device 130 usable in a system for determining, and presenting to a user, interaction opportunities for which the user qualifies according to one example of the present disclosure. As discussed above, user device 130 may include, for example, mobile devices such as smartphones and tablet computers, as well as other various types of user computing devices (e.g., home monitoring/security display devices, weather station displays, digital picture frames, smart watches, wearable computing devices, or vehicle-based display devices). Because the user device 130 may vary widely in functionality, any particular user device 130 may include all or only a subset of the components shown in FIG. 3. Additionally, in some cases, components illustrated in FIG. 3 may be localized to a single physical device or distributed among various networked devices, which may be disposed at different physical locations.

The user device 130 may include hardware elements that can be electrically coupled via a bus 302 (or may otherwise be in communication, as appropriate). The hardware elements may include a processing unit 304, which may comprise, without limitation, one or more general-purpose processors, one or more special-purpose processors (such as digital signal processing (DSP) chips, graphics acceleration processors, application specific integrated circuits (ASICs), or the like), or other processing structure, which can be configured to perform one or more of the methods described herein. As shown in FIG. 3, some examples may have a separate DSP 306, depending on desired functionality. The user device 130 also may include one or more input devices 326, which may be, without limitation, one or more keyboards, mouses, touch screens, touch pads, microphones, buttons, dials, switches, and the like. In some examples, users may input information into the user device 130, for authentication purposes and to view interaction opportunities. Accordingly, input devices 326 may include one or more compatible input components that allow the user to input such information, including touchscreens, touchpads, styluses, cameras or optical sensors, infrared (IR) sensors, motion sensing remote control devices, and the like. The user device 130 also may include one or more output devices 328, which may comprise without limitation, one or more display screens, light emitting diode (LED)s, projectors, speakers, or the like.

The user device (e.g., a mobile computing device) 130 may also include a wireless communication interface 370, which may comprise without limitation a modem, a network card, an infrared communication device, a wireless communication device, or a chipset (such as a Bluetooth® device, an IEEE 802.11 device, an IEEE 802.15.4 device, a Wi-Fi device, a WiMax device, cellular communication facilities, etc.), or the like, which may enable the mobile device 130 to communicate via the networks and servers described above with regard to FIGS. 1-2. The wireless communication interface 370 may permit data to be communicated with a network, wireless access points, wireless base stations, other computer systems, or any other electronic devices described herein. The communication can be carried out via one or more wireless communication antenna(s) 372 that send or receive wireless signals 374.

Depending on desired functionality, the wireless communication interface 370 may comprise separate transceivers to communicate with base stations (e.g., eNBs) and other terrestrial transceivers, such as wireless devices and access points, belonging to or associated with one or more wireless networks. These wireless networks may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as cdma2000, Wideband CDMA (WCDMA), and so on. Cdma2000 includes IS-95, IS-2000, or IS-856 standards. A TDMA network may implement GSM, Digital Advanced Mobile Phone System (D-AMPS), or some other RAT. An OFDMA network may employ LTE, LTE Advanced, NR and so on. LTE, LTE Advanced, NR, GSM, and WCDMA are described (or being described) in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN, or WPAN.

The user device 130 may further include at least one sensor 330. Such sensors may comprise, without limitation, one or more accelerometers, gyroscopes, cameras, magnetometers, altimeters, microphones, proximity sensors, light sensors, and the like. Some or all of the sensors 330 can be utilized, among other things, for detecting various environmental/contextual data at the location of the user device 130, for obtaining operational status of an appliance or electrical device, or for obtaining other types of data that may be communicated to a backend server.

Certain examples of the user device 130 may also include a SPS receiver 380 capable of receiving signals 384 from one or more SPS satellites using an SPS antenna 382, which may be combined with antenna(s) 372 in some implementations. Positioning of user devices 130 using SPS receivers 380 may be utilized to complement or incorporate the techniques described herein, and may be used to obtain sensor data by the user device 130. The SPS receiver 380 may support measurement of signals from SPS SVs of an SPS system, such as a GNSS (e.g., Global Positioning System (GPS)), Galileo, GLONASS, Quasi-Zenith Satellite System (QZSS) over Japan, Indian Regional Navigational Satellite System (IRNSS) over India, Beidou over China, or the like. Moreover, the SPS receiver 380 may be used with various augmentation systems (e.g., a Satellite Based Augmentation System (SBAS)) that may be associated with or otherwise enabled for use with one or more global or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), or the like. Thus, as used herein an SPS may include any combination of one or more global or regional navigation satellite systems or augmentation systems, and SPS signals may include SPS, SPS-like, or other signals associated with such one or more SPS.

Additionally, in some examples, the user device 130 may include a cryptocurrency wallet 362. Cryptocurrency wallet 362 may include one or more executable software components configured to store private and public keys, and to interact with one or more cryptocurrency blockchains, to enable the user device 130 to send and receive digital currency. In some examples, one or more types of cryptocurrency may be loaded onto the user device 130, along with predefined instructions or rules specifying when and how the cryptocurrency may be exchanged over time. Additionally or alternatively, the user device 130 may request and receive transfers of cryptocurrency via networks 140 from other user devices 130 or remote systems, via a network service provider or other third-party system.

The user device 130 may additionally include or be in communication with a memory 310. The memory 310 may comprise, without limitation, local or network accessible storage, a disk drive, a drive array, an optical storage device, a solid-state storage device, such as a random access memory ("RAM"), or a read-only memory ("ROM"), which can be programmable, flash-updateable, or the like. Such storage devices may be configured to implement any appropriate data stores, including without limitation, various file systems, database structures, or the like. The memory 310 may be used, among other things, to store sensor data received from sensors 330 using a database, linked list, or any other type of data structure. In some examples, wireless communication interface 370 may additionally or alternatively comprise memory.

The memory 310 of user device 130 also may comprise software elements (not shown), including an operating system, device drivers, executable libraries, or other code, such as one or more application programs, which may comprise computer programs provided by various embodiments, or may be designed to implement methods, or configure systems, provided by other embodiments, as described herein. The memory may additionally include an application 308 that may be installed on the user device 130. The application 308 may be configured to carry out the operations described herein such as displaying the interaction opportunities for which the user qualifies to the user. Merely by way of example, one or more procedures described with respect to the functionality for user device 130 discussed above might be implemented as code or instructions executable by user device 130 (or a processing unit 304 within the user device 130). Such code or instructions may be used to configure or adapt a general-purpose computer (or other device) to perform one or more operations in accordance with the techniques described herein.

Figure 4:
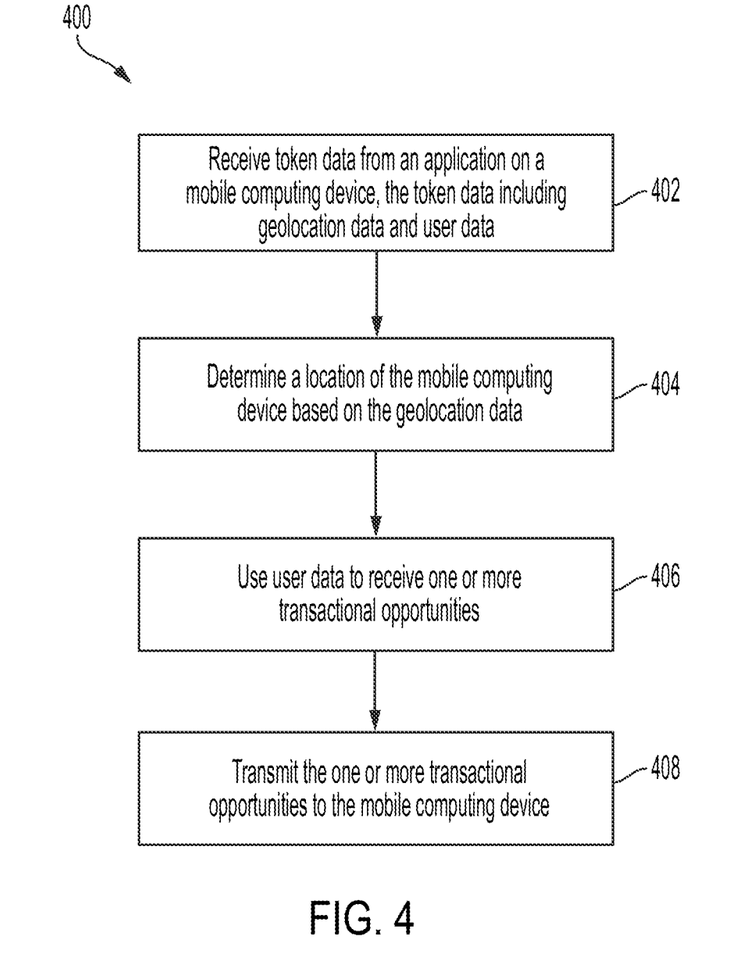
FIG. 4 is a flowchart of a process for determining, and presenting to a user, interaction opportunities for which the user qualifies within a pre-set distance according to one example of the present disclosure.

FIG. 4 is a flowchart of a process 400 for determining, and presenting to a user, interaction opportunities for which the user qualifies within a pre-set distance according to one example of the present disclosure.

In block 402, a server receives token data from an application installed on a mobile computing device of the user. The token data may include user data, such as user account information, and geolocation data such as a geolocation of the mobile computing device of the user. The token data may be acquired by the application via the mobile computing device. For example, upon the user initializing the application, the application may cause the mobile computing device to acquire and send the geolocation data of the mobile computing device to the server. The application may also receive input from the user in the form of user account information via a username and password combination.

In block 404, the server determines a geolocation of the mobile computing device based on the geolocation data of the token data received at block 402. In response to the token data received at block 402, the server may use the geolocation data to determine the geolocation of the mobile computing device of the user. The geolocation of the mobile computing device may be similar or identical to a geolocation of the user of the mobile computing device. The geolocation of the mobile computing device may be stored for subsequent use in determining interaction opportunities to present to the user.

In block 406, the server uses the user data to receive one or more interaction opportunities for which the user qualifies. The user data may include an interaction history of the user, and the interaction history may be used by the server to determine one or more interaction opportunities for which the user qualifies. In some examples, the server is a first server, and the first server transmits the user data to a second server, which can include an interaction opportunity determination server, for determining the one or more interaction opportunities. The second server may transmit the interaction opportunities to the first server, and the first server may receive the interaction opportunities. The interaction opportunities may be a non-location-sensitive total amount of interaction opportunities for which the user qualifies.

In block 408, the server transmits the one or more interaction opportunities to the mobile computing device for viewing by the user of the mobile computing device. In response to receiving the interaction opportunities at block 406, the server may determine a subset of interaction opportunities to transmit to the mobile computing device. This determination may be made based on the geolocation of the mobile computing device. The server may filter the interaction opportunities based on the geolocation of the mobile computing device, yielding the subset of interaction opportunities. The subset of interaction opportunities may be located within a pre-set distance of the geolocation of the mobile computing device. Upon filtering the interaction opportunities, the server may transmit the subset of interaction opportunities to the mobile computing device for viewing by the user of the mobile computing device. The interaction opportunities may be displayed to the user in various ways including push notifications, an augmented reality feature or augmented reality interface of the application of the mobile computing device, and the like.

Figure 5:
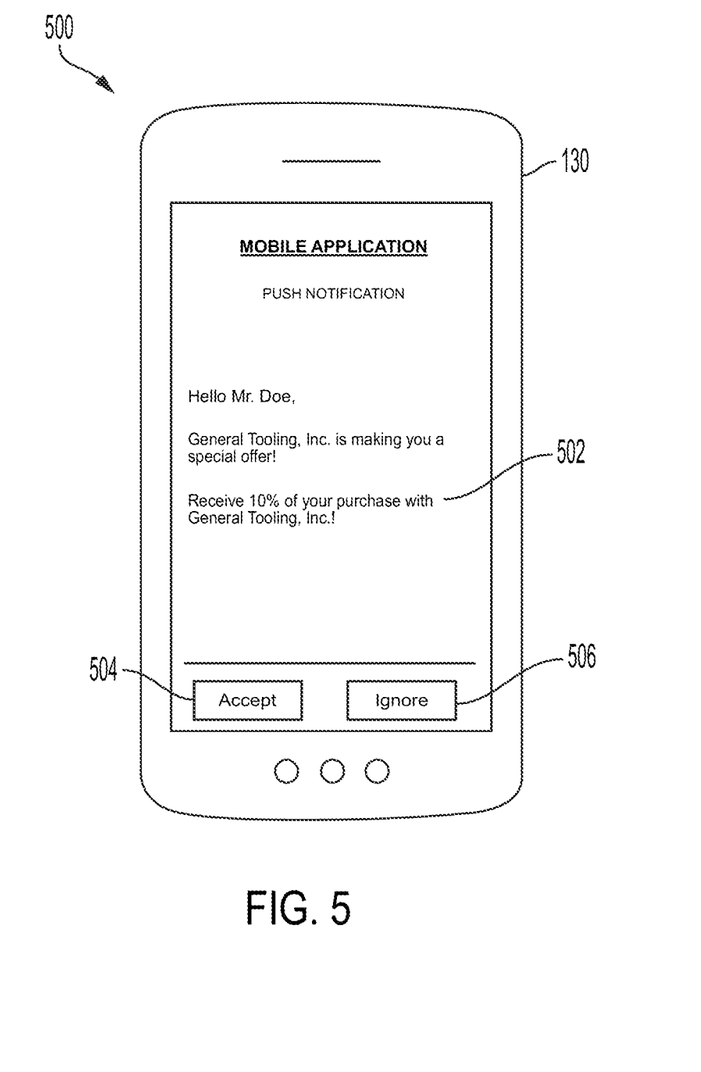
FIG. 5 is an example of a push notification presented to the user of the mobile computing device informing the user of an interaction opportunity.

FIG. 5 is an example push notification 500 presented to the user of the mobile computing device 130 informing the user of an interaction opportunity 502. As illustrated in FIG. 5, the user of the mobile device is Mr. Doe, and the interaction opportunity 502 is an offer from General Tooling Inc. The interaction opportunity may be presented as a user interface with an accept option 504 and an ignore option 506. In response to viewing the interaction opportunity 502, Mr. Doe may choose to accept or to ignore the interaction opportunity 502. Mr. Doe may select the accept option 504 or may select the ignore option 506. In response to selecting the accept option 504, the mobile computing device 130 of Mr. Doe may navigate Mr. Doe to General Tooling, Inc. for carrying out the interaction opportunity 502. While depicted as a pop-up push notification in FIG. 5, the interaction opportunity 502 may be displayed to the user of the mobile computing device 130 in other suitable manners such as a banner notification, home-screen notification, etc.

Figure 6:
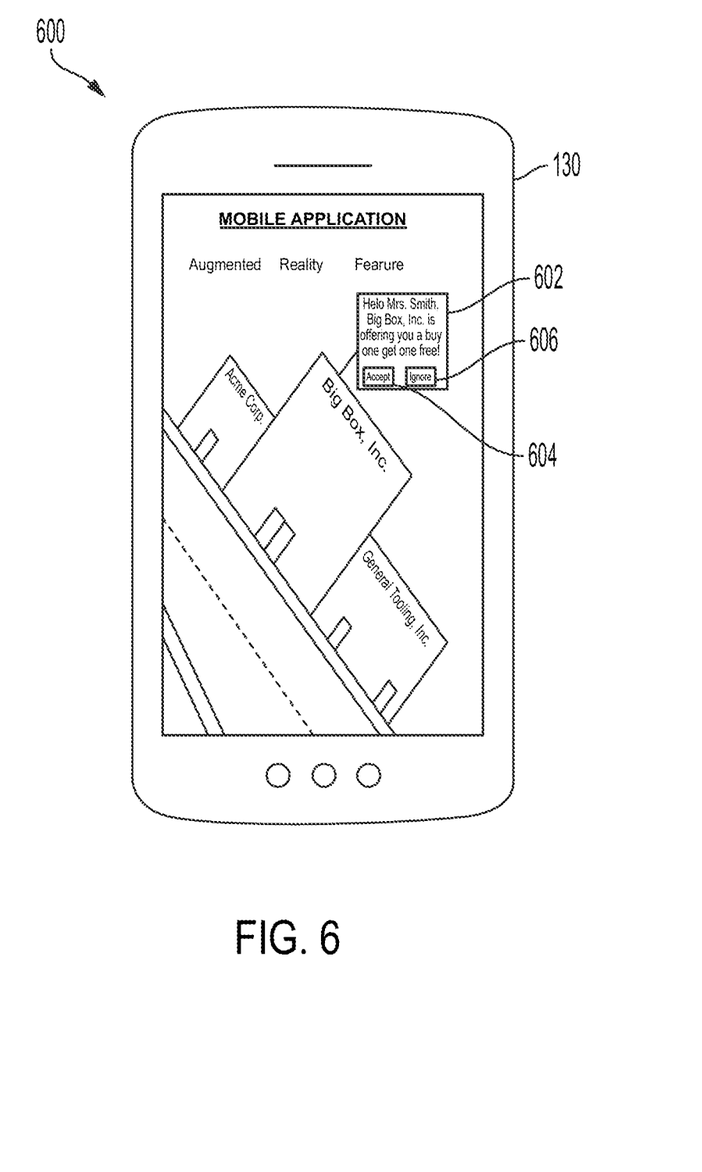
FIG. 6 is an example of a notification presented to the user of the mobile computing device in an augmented reality feature informing the user of an interaction opportunity.

FIG. 6 is an example notification 600 presented to the user of the mobile computing device 130 in an augmented reality feature informing the user of an interaction opportunity 602. The interaction opportunity 602 is an offer from Big Box, Inc. to the user (e.g., Mrs. Smith) of the mobile computing device 130. In this example, Mrs. Smith may have initialized the application installed on the mobile computing device 130 and may have initialized the augmented reality feature of the application. Mrs. Smith may have subsequently pointed the mobile computing device 130 at Big Box, Inc. for determining whether she qualifies for any interaction opportunities from Big Box Inc. The interaction opportunity 602 of FIG. 6 may be displayed to Mrs. Smith in the augmented reality feature as a user interface with an accept option 604 and an ignore option 606. Mrs. Smith may choose to accept the interaction opportunity 602 by selecting the accept option 604, or Mrs. Smith may choose to ignore the interaction opportunity 602 by selecting the ignore option 606. In selecting the accept option 604, the augmented reality feature may cause the mobile computing device 130 to display a coupon or other suitable documentation for allowing Mrs. Smith to receive the interaction opportunity 602.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A server comprising:
    a processor device; and
    a non-transitory, computer-readable memory having computer-executable instructions that are executable by the processor device to cause the server to perform operations comprising:

receiving token data from an application executing on a mobile computing device, the token data comprising geolocation data of the mobile computing device and identification data of a user;
determining a location of the mobile computing device using the geolocation data;
determining, using a trained neural network included on the server and using the identification data of the user, one or more interaction opportunities (i) for which the user qualifies based on financial account interaction data associated with the identification data of the user and criteria associated with the one or more interaction opportunities and (ii) that are associated with one or more locations within a pre-selected distance of the location of the mobile computing device, wherein determining the one or more interaction opportunities includes mapping, using the trained neural network, information from an interaction history of a user of the mobile computing device to available interaction opportunities stored on the server; and
transmitting the one or more interaction opportunities to the mobile computing device for output by the application.

2. The server of claim 1, wherein the operation of transmitting the one or more interaction opportunities to the mobile computing device for output by the application comprises transmitting the one or more interaction opportunities to the mobile computing device for the application to output a notification, as configured via the application, to the user about the one or more interaction opportunities.

3. The server of claim 1, wherein the operation of transmitting the one or more interaction opportunities to the mobile computing device for output by the application comprises transmitting the one or more interaction opportunities to the mobile computing device for the application to output an augmented reality interface that includes a representation of an interaction opportunity of the one or more interaction opportunities positionally associated with a view of the location for the interaction opportunity through the augmented reality interface.

4. The server of claim 1, wherein the operations further comprise:
receiving a set of interaction opportunities based on the geolocation data of the mobile computing device, wherein the one or more interaction opportunities are a subset of the set of interaction opportunities; and
determining, by applying a filter to the set of interaction opportunities, the one or more interaction opportunities based on the identification data of the user, wherein the one or more interaction opportunities are configured to be displayed on the mobile computing device via a mobile computing device notification and via an augmented reality feature.

5. The server of claim 1, wherein the operations further comprise:
receiving a set of interaction opportunities based on the identification data of the user, wherein the one or more interaction opportunities are a subset of the set of interaction opportunities; and
determining, by applying a filter to the set of interaction opportunities, the one or more interaction opportunities based on the geolocation data of the mobile computing device, wherein the one or more interaction opportunities are configured to be displayed on the mobile computing device via a mobile computing device notification and via an augmented reality feature.

6. The server of claim 1, wherein the operation of receiving the token data from the application executing on the mobile computing device comprises receiving the token data from the application executing on the mobile computing device via an augmented reality feature of the application.

7. The server of claim 1, wherein the operation of transmitting the one or more interaction opportunities to the mobile computing device for output by the application comprises transmitting the one or more interaction opportunities to the mobile computing device as an interactive notification that is configured to launch an augmented reality feature of the application for displaying the one or more interaction opportunities.

8. A method comprising:
receiving token data from an application executing on a mobile computing device, the token data comprising geolocation data of the mobile computing device and identification data of a user;
determining a location of the mobile computing device using the geolocation data;
determining, using a trained neural network and using the identification data of the user, one or more interaction opportunities (i) for which the user qualifies based on financial account interaction data associated with the identification data of the user and criteria associated with the one or more interaction opportunities and (ii) that are associated with one or more locations within a pre-selected distance of the location of the mobile computing device, wherein determining the one or more interaction opportunities includes mapping, using the trained neural network, information from an interaction history of a user of the mobile computing device to available interaction opportunities; and
transmitting the one or more interaction opportunities to the mobile computing device for output by the application.

9. The method of claim 8, wherein transmitting the one or more interaction opportunities to the mobile computing device for output by the application comprises transmitting the one or more interaction opportunities to the mobile computing device for the application to output a notification, as configured via the application, to the user about the one or more interaction opportunities.

10. The method of claim 8, wherein transmitting the one or more interaction opportunities to the mobile computing device for output by the application comprises transmitting the one or more interaction opportunities to the mobile computing device for the application to output an augmented reality interface that includes a representation of an interaction opportunity of the one or more interaction opportunities positionally associated with a view of the location for the interaction opportunity through the augmented reality interface.

11. The method of claim 8, further comprising:
receiving a set of interaction opportunities based on the geolocation data of the mobile computing device, wherein the one or more interaction opportunities are a subset of the set of interaction opportunities; and
determining, by applying a filter to the set of interaction opportunities, the one or more interaction opportunities based on the identification data of the user, wherein the one or more interaction opportunities are configured to be displayed on the mobile computing device via a mobile computing device notification and via an augmented reality feature.

12. The method of claim 8, further comprising:
- receiving a set of interaction opportunities based on the identification data of the user, wherein the one or more interaction opportunities are a subset of the set of interaction opportunities; and
- determining, by applying a filter to the set of interaction opportunities, the one or more interaction opportunities based on the geolocation data of the mobile computing device, wherein the one or more interaction opportunities are configured to be displayed on the mobile computing device via a mobile computing device notification and via an augmented reality feature.

13. The method of claim 8, wherein receiving the token data from the application executing on the mobile computing device comprises receiving the token data from the application executing on the mobile computing device via an augmented reality feature of the application.

14. The method of claim 8, wherein transmitting the one or more interaction opportunities to the mobile computing device for output by the application comprises transmitting the one or more interaction opportunities to the mobile computing device as an interactive notification that is configured to launch an augmented reality feature of the application for displaying the one or more interaction opportunities.

15. A non-transitory computer-readable medium comprising instructions that are executable by a processing device for performing operations, the operations comprising:
- receiving token data from an application executing on a mobile computing device, the token data comprising geolocation data of the mobile computing device and identification data of a user;
- determining a location of the mobile computing device using the geolocation data;
- determining, using a trained neural network and using the identification data of the user, one or more interaction opportunities (i) for which the user qualifies based on financial account interaction data associated with the identification data of the user and criteria associated with the one or more interaction opportunities and (ii) that are associated with one or more locations within a pre-selected distance of the location of the mobile computing device, wherein determining the one or more interaction opportunities includes mapping, using the trained neural network, information from an interaction history of a user of the mobile computing device to available interaction opportunities stored; and
- transmitting the one or more interaction opportunities to the mobile computing device for output by the application.

16. The non-transitory computer-readable medium of claim 15, wherein the operation of transmitting the one or more interaction opportunities to the mobile computing device for output by the application comprises transmitting the one or more interaction opportunities to the mobile computing device for the application to output a notification, as configured via the application, to the user about the one or more interaction opportunities.

17. The non-transitory computer-readable medium of claim 15, wherein the operation of transmitting the one or more interaction opportunities to the mobile computing device for output by the application comprises transmitting the one or more interaction opportunities to the mobile computing device for the application to output an augmented reality interface that includes a representation of an interaction opportunity of the one or more interaction opportunities positionally associated with a view of the location for the interaction opportunity through the augmented reality interface.

18. The non-transitory computer-readable medium of claim 15, wherein the operations further comprise:
- receiving a set of interaction opportunities based on the geolocation data of the mobile computing device, wherein the one or more interaction opportunities are a subset of the set of interaction opportunities; and
- determining, by applying a filter to the set of interaction opportunities, the one or more interaction opportunities based on the identification data of the user, wherein the one or more interaction opportunities are configured to be displayed on the mobile computing device via a mobile computing device notification and via an augmented reality feature.

19. The non-transitory computer-readable medium of claim 15, wherein the operations further comprise:
- receiving a set of interaction opportunities based on the identification data of the user, wherein the one or more interaction opportunities are a subset of the set of interaction opportunities; and
- determining, by applying a filter to the set of interaction opportunities, the one or more interaction opportunities based on the geolocation data of the mobile computing device, wherein the one or more interaction opportunities are configured to be displayed on the mobile computing device via a mobile computing device notification and via an augmented reality feature.

20. The non-transitory computer-readable medium of claim 15, wherein the operation of receiving the token data from the application executing on the mobile computing device comprises receiving the token data from the application executing on the mobile computing device via an augmented reality feature of the application, and wherein the operation of transmitting the one or more interaction opportunities to the mobile computing device for output by the application comprises transmitting the one or more interaction opportunities to the mobile computing device as an interactive notification that is configured to launch an augmented reality feature of the application for displaying the one or more interaction opportunities.

* * * * *